Feb. 23, 1943.   S. N. SETTERLUND   2,312,125
FOOD MIXER
Filed Nov. 3, 1939   2 Sheets-Sheet 1

Inventor:
Sidney N. Setterlund
By Mann, Brown &Co
Attys.

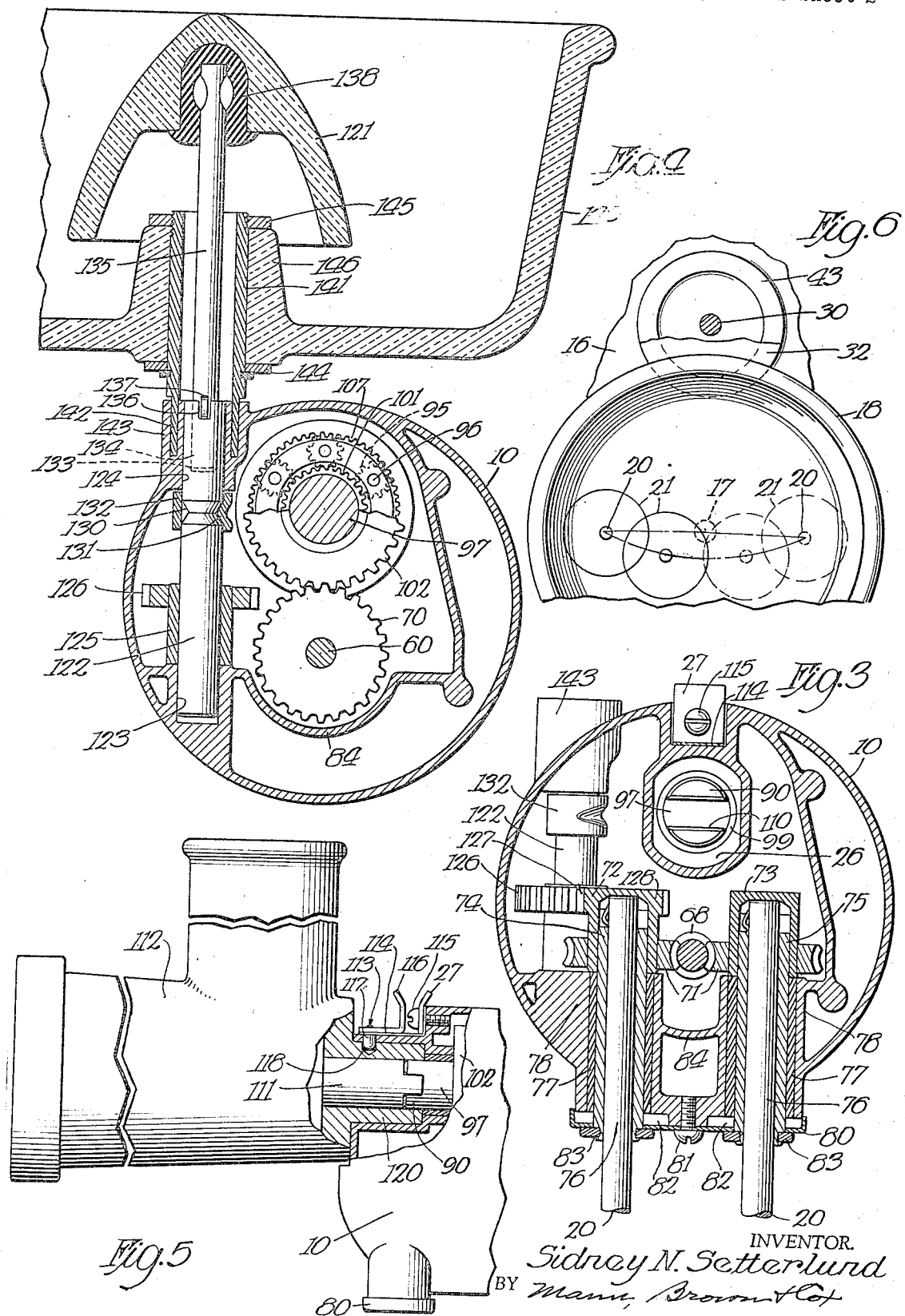

Patented Feb. 23, 1943

2,312,125

UNITED STATES PATENT OFFICE 2,312,125

FOOD MIXER

Sidney N. Setterlund, Elmhurst, Ill.

Application November 3, 1939, Serial No. 302,732

5 Claims. (Cl. 259—84)

The present invention relates generally to food mixers and more particularly to improvements in operating various food processing tools including the transmission and bodily movement of the tools during their operation.

In the use of a household appliance such as a food mixer which drives a plurality of food processing tools, a special mixing bowl is generally employed and rotatably mounted to operate in conjunction with the tools, particularly the food beater or beaters.

In view of the fact that varying volumes of liquid are mixed from time to time, bowls of various sizes are supplied to provide the best mixing results. Obviously, the beaters must be small enough to work in the small bowls, yet be able to operate efficiently in the large bowls.

In order to do this it has been the conventional practice in some instances either to shift the bowl or slide it from one position to another on a base under the beaters. In doing this, the bowl, because of human frailty or other causes is not shifted smoothly, or because the sliding mechanism binds, the contents of the bowl are spilled over the sides of the bowl. Moreover, in many instances, the shifting cannot be done without stopping the motor and raising the beaters, all of which creates delay and dissatisfaction, and what sliding back and forth is done does not take advantage of the fullest possible movement of the beaters in the bowl.

In connection with the food processing tools capable of use while the mixing operation is going on it is to be noted that, in many conventional devices, it is impossible or impractical to drive high torque low speed appliances, such as a meat grinder or food shredder, while the food beaters are operating in the bowl. This has arisen either because the food shredder must be powered from the beater sockets, or, within the limits of competitive manufacturing cost, the appliance is not built strong enough to carry safely the combined loads.

In this last instance, the difficulty confronting the manufacturer involves a balancing of expedients between an inexpensive fractional horsepower motor and an inexpensive transmission, a transmission such as one having double worm gear reductions that encounter high power losses for the two power takeoffs.

If the double worm transmission is employed the added expense of a stronger motor confronts the manufacturer. If a more efficient transmission is employed an added expense is encountered in the extra gearing which involves gear reductions as high as 15 to 1 upon the beater shaft and 250 to 1 upon the power takeoff shaft. Moreover, the 15 to 1 ratio upon the beater shaft is not acceptable for the best results in extracting juice from citrous fruits, and has to be remedied by added gearing. The preferred speed of juice extraction involves a gear reduction in the ratio of one hundred to one.

As a means for combating these contigencies and in order to meet competitive manufacturing costs, many manufacturers by their designs have heretofore prevented or avoided the possibility of work loads being carried by all three outlets of transmitted power at one time, namely, the food beaters, the low-speed food choppers, and the medium-speed juice extractors.

With this in mind, it is one of the objects of the present invention to provide a food mixer capable of driving all three food processing units simultaneously, and driving them in cooperation with the bodily movement of one of them, namely, the food beaters. Also, to drive them, or any of them, without disturbing or impairing the operation of any one or all of the other food processing operations, and, in doing these things, avoid any spilling of the contents of the bowl when the beater and the bowl are moved relative to each other.

Another object of the invention is to provide an improved, compact, power output transmission, for any given applied horsepower, capable of carrying simultaneously all expected loads at all of the gear reduction ratios mentioned.

Furthermore, I provide a transmission mechanism which not only attains improved results, but also is less expensive and more simple in construction than conventional transmissions that afford comparable results when connected to motors of a given size or rating.

A further object of the invention is to enable a wide angle movement of the improved transmission and mixer so that whether the bowl is on the mixer base or near it, all of the food processing operations, being performed at any time, may be shifted relative thereto whenever desired.

In this connection it is desirable to provide maximum clearance and head room for as large a bowl as possible. The transmission of the present invention makes this possible. The beaters can be located nearer to the front end of the housing to provide a deeper overhang without materially shifting the center of supported weight.

In this connection it is interesting to note that the presence of any overhanging weight at all imposes upon a support the problem which has forced many manufacturers to the now conventional system of shifting the bowl rather than the beaters when providing a way to change the relative working area of the beaters in the bowl.

In those instances where the beaters are the units moved, the overhung weight is supported for pivotal movement above the base in the body of the pedestal where a long vertical pivotal bearing member could be used. In these instances the axis is comparatively remote from the beaters and the arc traversed by the beaters is small.

In the present invention I provide the pivot point at the base between vertical projections of the beaters and the housing support. Here the moment of force of the overhung load is appreciably diminished by the location of a pivot point closer to the center of gravity of the overhung weight, where, incidentally, the pivot also provides a wider angle of movement for the beaters, the fineness of adjustment in locating the beaters at any desired spot being thereby minimized.

Moreover, the location of the pivot point in the present invention is at a point where wide planar beating surfaces of a large area can be provided to minimize pivot pin stress and binding.

A further object of the invention is to provide improved constructions and arrangement of parts relating to the several improvements and to provide a device which is simple and easy to assemble, durable under long periods of sustained heavy use, and inexpensive to manufacture and service.

These being among the objects of the invention, other and further objects will become apparent from the drawings, the description relating thereto and the appended claims.

Referring now to the drawings—

Fig. 3 is a section taken upon the line 3—3 in Fig. 1;

Fig. 4 is a section taken upon the line 4—4 of Fig. 1 with the construction and location of a juicer attachment shown as assembled therewith;

Fig. 5 is a fragmentary side elevation partly in section illustrating the manner in which a food processing device such as a meat chopper is attached for operation; and Fig. 6 is a diagrammatic top plan view illustrating the relative movement of the beaters in the bowl.

Figures 1, 2:
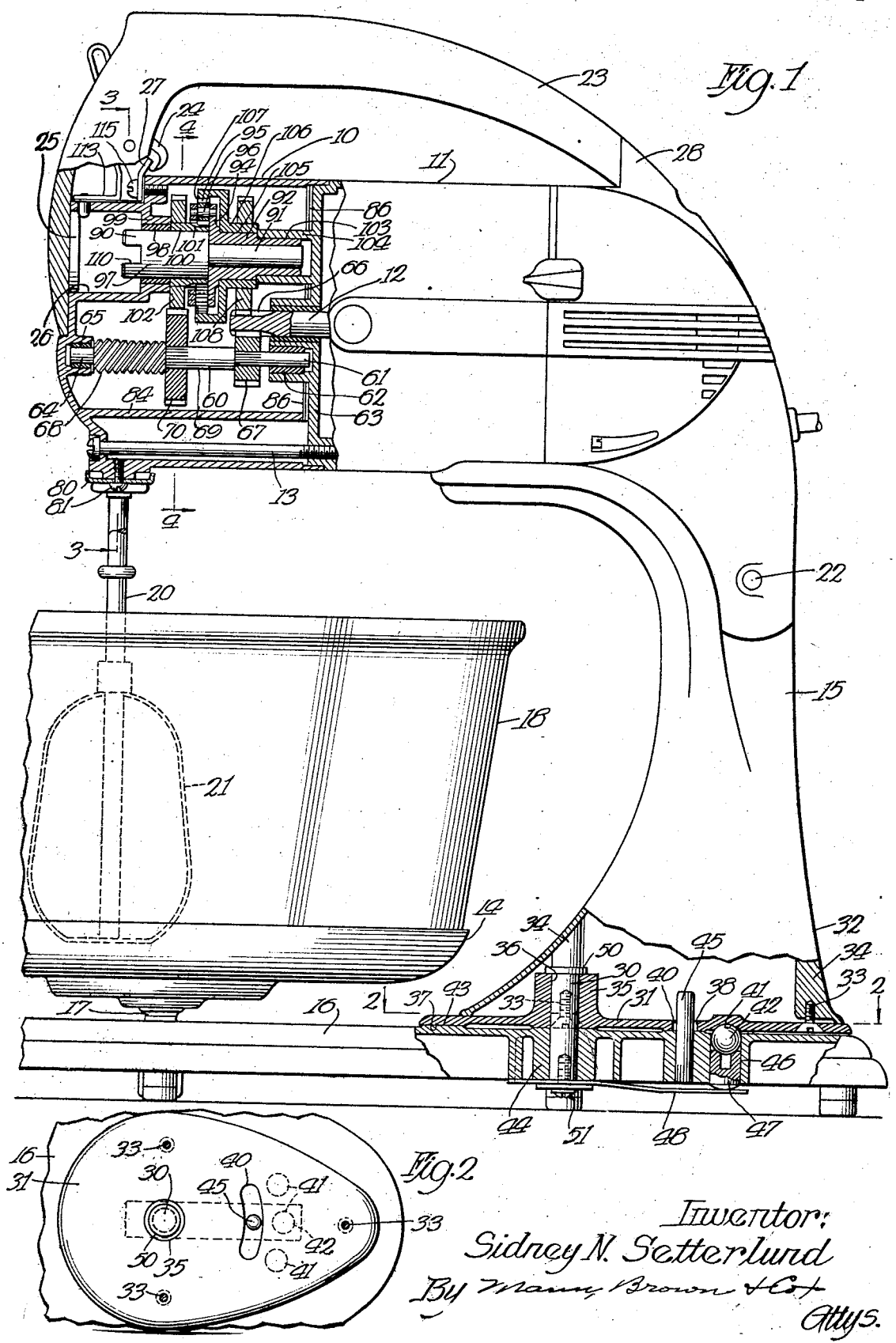
Fig. 1 is a side elevation partly in section of a food mixer incorporating certain embodiments selected to illustrate and supplement a clear and concise description of the invention.
Fig. 2 is a reduced section taken upon the line 2—2 in Fig. 1.

Referring now to the drawings in further detail:

A food mixer is shown in Fig. 1 comprising a gear housing 10 mounted upon the front end of an electrically powered motor unit 11 having an armature shaft 12 extending into the transmission housing. The transmission housing and motor driving unit are held together by bolts 13 in unitary relation as supported above a bowl carrying turntable 14 by means of a standard 15 mounted upon a base 16 in which the turntable 14 is journaled as at 17. The turntable supports bowls of varying sizes, a large one of which 18 is shown in place.

Beaters 20 are detachably carried by the transmission where they are disposed in the bowl as shown in dotted lines 21 in their lowered position with their axes offset slightly from the axes of the turntable 14. The beaters are raised and lowered with regard to the bowl by movement of the transmission and power unit about the horizontally disposed pivot pin 22 carried by the support 15. A handle for managing the transmission and power unit is indicated by the numeral 23 and is detachably mounted for removal by a latch 24. The handle carries the weight of the housing at its front end by means of a lug 25 fitting into the power takeoff socket 26 at the front of the transmission as held by the latch 24 against a keeper 27, and at the rear end of the handle by a projection (not shown) received in the boss 28 on top of the unit.

Whenever it is desirable to use the power takeoff socket 26 or the juicer attachment, the handle 23 is readily removed to clear the respective power shafts.

In addition to a pivotal movement about the pin 22 the power unit is mounted for horizontal pivotal movement about a vertical pin 30 so that the beaters 20 may be moved either by the handle 23 or otherwise from one side to the other of the bowl 18 with enough latitude in the movement to permit the beaters to engage against the side of the bowl to wipe the sides clean of ingredients clinging thereto.

The movement of the beaters is along an arc, the radius of which includes approximately the greater portion of the diameter of the bowl (Fig. 6). The beaters 21, as shown, are large enough in diameter themselves to cover the area between their centers and the center of the bowl as they are moved manually to or through their central position in the bowl. This enables the beaters to have maximum movement in the bowl from side to side along an arc, the chord of which approximately coincides with the diameter of the bowl, as distinguished from the more limited arcs resulting if the beaters pass through or short of the center of the bowl. In this way the operation of the mixer not only provides maximum interdigitating movement of the beaters in the bowl but also the maximum mixing action possible with bodily movement of the beaters in the bowl, it being interesting to note, at this time, that it is one of the purposes of the present invention to locate the pivot point in relation to the position of the beaters, as determined with extra overhang permitted by the transmission construction, at a point spaced from the center of the bowl a distance designed to obtain the above result.

In accomplishing the mounting of the support 15 for pivotal movement upon the base 16 about the shaft 30 I prefer to mount a plate 31 upon the flared lower portion 32 of the support 15 by means of screws 33 threaded into bosses 34. The plate 31, where it is to receive the pin 30, is provided with a boss 35 reamed out as at 36 to receive the pin 30 in journaled relation before the plate is fastened. Concentrically around the pin 30, the plate 31 is provided upon its lower surface with a raised planar bearing surface 37. At the rear edge of the surface, as at 38, the raised portion is provided with an arcuate slot 40 (Fig. 2), which is also concentric with the shaft 30. To the rear of the arcuate slot 40 the plate is provided with spaced detents 41 adapted to receive therein a ball 42 which in its action provides a "feel" for an operator moving the handle 23 back and forth in locating the beaters at any desired point.

Mating with the planar bearing surface 37 upon the plate 31 is a similar surface 43 upon the top of the base 16, concentric to an integral bearing boss 44, for receiving the pin 30 in supported relation. A peg 45 is mounted in the base to cooperate with the slot 40 to limit extreme movements of the support 15 on the shaft pin 30. The ball 42, mating with the detents 41, is mounted in a passageway 46 in the base and is held thereby a piston 47 urged upwardly by a leaf spring 48.

The pin 30 has a head 50 at its upper end and a threaded opening at its lower end whereby it is secured in place to hold the support 15 and the base 16 together under an adjusted pressure developed by means of a washer and screw assembly 51. The leaf spring 48 is secured in place thereby also.

In addition to the other advantages already mentioned, relating to the manner in which the supports are pivotally mounted, it will be seen that the pivot point is advantageously located without disrupting the pleasing design of the support, and is located where part of the weight the pivot has to bear is partially balanced and a large diameter bearing surface having very little wear is had to permit full freedom of movement without binding.

Referring now to the transmission, a countershaft for the motor shaft 12 is indicated at 60 which comprises a reduced end portion 61 journaled in a bearing 62 upon the front wall 63 of the motor housing 11. The front end 64 of the countershaft 60 is also of a reduced diameter and is journaled in a bearing 65 in the front end of the transmission housing 10. The front end of the motor shaft 12 has gear teeth 66 cut thereon and the reduced end portion 61 of the countershaft has press fitted thereon a gear 67 mating with and driven by the teeth 66. The front end of the shaft 61 is provided with a worm gear 68 and upon the intermediate portion 69 of the shaft 60 another gear 70 is press fitted.

Referring now to Fig. 3, the worm 68 drives upon opposite sides thereof and in opposite directions two worm wheels 71 mounted upon caps 72 and 73 which in turn are press fitted on sleeves 74 and 75, respectively. The sleeves receive, in detachably mounted relation, the upper ends 76 of the beater shafts. The sleeves 74 and 75 are journaled in long bearings 77 provided in bosses 78 that are cast integrally with the transmission housing and the bearings are covered at their lower ends by a shield 80 secured to the bottom of the transmission housing by a screw 81. The cover serves as a gland means for holding grease packing 82 in place around the sleeves 74 and 75.

The caps 72 and 73 support the sleeves 74 and 75 against downward movement, and at the lower ends of the sleeves, rings 83 swaged thereto also serve to hold the shield 80 in place.

In the transmission housing a false bottom or floor 84 is provided to hold the gear lubricant in close proximity to the gears, it being more or less possible with this particular construction to provide a substantial supply of grease in this compartment, since, at the rear thereof a grease wall 86 is secured against the rear end of the false door 84.

The power takeoff socket 26 is located above the shaft 60 where at the rear thereof a power takeoff shaft 90 is provided which has a reduced rear end portion 91 press fitted in the sleeve 92 of a planetary gear member 94 having a plurality of planet gears 95 secured thereto by swaged pins 96 upon which they are journaled.

The power shaft 90 is provided with a larger cylindrical portion 97 which is journaled at its front end in the bearing 98 that is pressed into the boss 99. At the rear portion of the enlarged portion 97 the shaft 90 has journaled thereon a sleeve 100 which has cut therein the teeth 101 of a sun gear meshing with the planet gears 95. The sun gear has press fitted thereto a gear 102 driven by the gear 70 upon the countershaft 60.

At the rear end of the power take-off shaft 90, the sleeve 92 has two bearing surfaces of different diameters. The smaller one 103 of which, is journaled in the boss 104 upon the front wall 63 of the motor housing 11. The larger bearing area 105 has journaled thereon the hub 106 of an internally toothed ring gear 107 meshing also with the planet gears 95. The ring gear is driven directly from the motor shaft 12 by means of a gear 108 press fitted to the hub 106 of the ring gear.

The operation of the transmission is such that the sun and ring gears are driven at comparative high speeds and at different speeds, the speed differential is preferably enough to provide a 250 to 1 reduction which is imposed upon the planet gears and from them transmitted to the power take-off shaft 90. The high speed of the gears makes for low load on the gear teeth, thereby increasing longevity and durability of the transmission.

It will be noted that this arrangement is very compact without any worm gearing in the power take-off gear train, and lends itself to change for other gear ratios without altering the general organization. All gear engagements have rolling contacts and the change is simply accomplished by changing the ratio of the two gears 70 and 102.

It will also be noted that the motor shaft which has the highest speed and the full load is balanced against side thrusts. Moreover, the power loss at the balanced worm drive is minimized by an immediate shaft-speed reduction at the gears 66 and 67, the slower speed permitting the use of a larger diameter and more heavily multi-threaded worm and a smaller worm wheel and shorter bearings which permit a deeper overhang of the beaters.

Not only this, but the power take-off shaft carrying suddenly applied heavy loads now and then is not only provided with a 250 to 1 speed reduction in a small space, but also is positively powered by gears moving in the same direction with the load balanced all the way around the shaft without end thrust in a way reducing the bearing area needed.

The front end of the power take-off shaft 90 is provided with a rectangular slot 110 for engagement with a shaft of any one of a plurality of food treating attachments such as the shaft 111 upon the food chopper 112. The attachment is secured to the transmission housing by a snap latch 113 pressed by a spring 114 that is held in place by the same screw 115 with which the keeper 27 is fastened. The latch 113 comprises an angle member 116 riveted to the front end of the spring by a rivet 117 having an elongated head extending through the upper wall of the power take-off socket and so constructed and arranged as to engage a recess 118 upon the boss 120 of the food chopper into which it snaps when mating.

Whenever it is desirable to attach the food chopper, the handle 23 is removed by releasing the latch 24. The boss 120 is then inserted into the socket 26 with or without the upper end of the angle member 116 being pressed rearwardly to lift the stud 117 to clear the boss 120 until the recess 118 is reached. Detachment is in the reverse. The stud 117 is lifted and the boss 120 removed, whereupon the handle may be again locked in place.

Referring now to Fig. 4, a construction is shown whereby a fruit juicer is attached and the reamer 121 thereof driven from the power transmission at the proper speed.

The juicer shaft is indicated at 122 where it is journaled at its lower end in a socket 123 and at its upper end in a bearing 124. In the space between the two bearings the juicer shaft has secured thereto a sleeve 125 with a gear 126 mounted thereon by a press fit. The gear 126 is driven from the gear teeth 127 cut in the edge of a headed portion 128 upon the sleeve 72. Adjacent its upper end the shaft is circumferentially grooved as at 130 to receive in locking relationship therewith a portion 131 upset therein from the body portion of a lock collar 132 at the time the shaft 122 is installed. Between the upper end of the collar 132 and the lower end of the sleeve 125 riding against the adjacent ends of the two bearings, the shaft is secured against longitudinal displacement in a manner holding the gear 126 in mesh with the gear teeth 127. At its upper end the shaft 122 is provided with a cylindrical bore 133 for receiving the complementary end portion 134 of a reamer shaft 135. Cross slots 136 are provided at the upper end of the juicer shaft 122 for receiving pressed radial flanges 137 carried by the reamer shaft 135.

The reamer 121 may be constructed in any suitable manner and mounted upon the upper end of the reamer shaft 135 by means of a plastic 138.

The juicer bowl is indicated at 140 where it is mounted upon a sleeve 141 which extends into a cylindrical aperture 142 cut or dye cast in the boss 143 upon the transmission housing. The sleeve 141 supports the juicer bowl 140 by means of a supporting washer 144 at the bottom thereof and a clamp nut 145 threaded on the upper end of the sleeve against the upper end of a hub 146 cast integrally with the bowl 140.

Having thus described my invention and discussed certain changes and modifications, and although a single embodiment has been illustrated, it will be apparent to those skilled in the art that various other uses, modifications and changes may be made without departing from the spirit and substance of the invention, the scope of which is commensurate with the appended claims.

What is claimed is:

1. In a food mixer having a bowl and a support overhanging the bowl to dispose beaters therein, a base member having a bore receiving a vertical pin below the bowl, means for pivotally mounting the support on the base member for pivotal movement relative to the bowl comprising a plate member secured to the support and receiving said pin, a planar bearing surface concentrically located with respect to the pin, a planar bearing surface upon the base member mating with that on the plate member, an arcuate groove on one of said members receiving a pin carried by the other member, and a detent element carried by one of the members and engaging detents in the other of said members.

2. In a food mixer, a base, power driven beater unit, a rotatable bowl, and means supporting the unit and bowl for relative arcuate movement the chord of which passes approximately through the middle of the bowl and the arc of which passes beyond the center of the bowl.

3. A food mixer comprising a base, a bowl supported on the base, a support extending downwardly and towards the bowl support, means pivotally securing the support to the base for horizontal movement about a vertical axis near the front lower edge of the support, including planar bearing surfaces and a feeler member for indicating the relative positions of the support and base, a transmission means pivotally mounted upon the support for pivotal movement about a horizontal axis and providing a socket near its front end for detachably supporting a food beater for movement into and out of the bowl through any one of a plurality of arcs determined by the relative position of the support and base regarding their relative horizontal movement.

4. A food mixer comprising a base, a bowl rotatably mounted thereon, a power driven beater unit disposed over the bowl, a support for the unit providing maximum overhang for the unit over the bowl, means connecting the support and base for pivotal movement about a vertical axis within the overhang and including planar bearing surfaces and a feeler member for indicating the relative positions of the support and base.

5. A food mixer comprising a base, a bowl rotatably mounted thereon, a power driven beater unit disposed over the bowl, a support for the unit providing maximum overhang for the unit over the bowl, means connecting the support and base for pivotal movement about a vertical axis within the overhang and including raised portions upon the base having planar bearing surfaces disposed above the level of the top of the base a short distance to provide clearance between the base and support, and a feeler member for indicating the relative positions of the support and base.

SIDNEY N. SETTERLUND.